(12) United States Patent
Suzuoki

(10) Patent No.: US 7,774,512 B2
(45) Date of Patent: Aug. 10, 2010

(54) METHODS AND APPARATUS FOR HYBRID DMA QUEUE AND DMA TABLE

(75) Inventor: Masakazu Suzuoki, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 411 days.

(21) Appl. No.: 11/053,509

(22) Filed: Feb. 8, 2005

(65) Prior Publication Data
US 2006/0179179 A1    Aug. 10, 2006

(51) Int. Cl.
*G06F 3/00* (2006.01)
(52) U.S. Cl. .................. 710/22; 711/146; 713/320
(58) Field of Classification Search .............. 710/5, 710/22
See application file for complete search history.

(56) References Cited

U.S. PATENT DOCUMENTS

| | | | | |
|---|---|---|---|---|
| 5,634,099 A | * | 5/1997 | Andrews et al. | 709/212 |
| 5,717,952 A | * | 2/1998 | Christiansen et al. | 710/22 |
| 6,128,674 A | | 10/2000 | Beukema et al. | |
| 6,154,793 A | * | 11/2000 | MacKenna et al. | 710/23 |
| 6,526,491 B2 | | 2/2003 | Suzuoki et al. | |
| 2002/0038393 A1 | * | 3/2002 | Ganapathy et al. | 710/22 |
| 2003/0120876 A1 | * | 6/2003 | Hass et al. | 711/146 |
| 2004/0243738 A1 | * | 12/2004 | Day et al. | 710/22 |
| 2006/0015652 A1 | * | 1/2006 | Day et al. | 710/5 |

OTHER PUBLICATIONS

ISR and Written Opinion*, Jun. 14, 2006.

* cited by examiner

*Primary Examiner*—Henry W. H. Tsai
*Assistant Examiner*—Elias Mamo
(74) *Attorney, Agent, or Firm*—Matthew B. Dernier, Esq.; Gibson & Dernier LLP

(57) ABSTRACT

Methods and apparatus provide for assigning an identifier to a DMA command, the identifier for association with an entry of a DMA table containing status information regarding the DMA command; receiving an indication that a DMA data transfer defined by the DMA command has been completed; and updating the status information of the entry of the DMA table associated with the DMA data transfer to indicate that the DMA data transfer has been completed.

38 Claims, 9 Drawing Sheets

METHODS AND APPARATUS FOR HYBRID DMA QUEUE AND DMA TABLE

BACKGROUND

The present invention relates to methods and apparatus for transferring data within a multi-processing system.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

A conventional processing system may employ direct memory access (DMA) technology to transfer data from one memory to another device, which may be another memory. A DMA command queue may be used to store pending DMA commands, as it may take a relatively long time to complete a DMA transfer. Unfortunately, the inability for the application program that issued the DMA command to know the status of the DMA transfer leads to inefficient processing throughput.

SUMMARY OF THE INVENTION

One or more aspects of the invention may provide for an application program to have notice of the status of a particular DMA command. For example, the application program may carry out other tasks while waiting for a DMA transfer to be completed. The present invention provides a mechanism for the application program to obtain status information concerning any particular DMA command.

One or more embodiments of the invention may include a hardware DMA command queue, a software DMA status table, and a software snoop controller. The hardware DMA command queue contains the DMA commands and a tag identifier for each. The software DMA status table is preferably located in a local memory of the processing system and includes for each of the DMA commands in the DMA queue: a corresponding tag, the start address, the end address, the inbound/outbound designation, and the status.

When the processor invokes a DMA command, the software snoop controller registers the command by assigning a tag and adding an entry into the software DMA status table. When a DMA handler is called, the software snoop controller updates (synchronizes) the status of the entries in the software DMA status table. The application program running on the processor may "peek" at an address in the local memory by issuing a request to the software snoop controller. The software snoop controller determines which DMA command is associated with the address by comparing the address to the start/end addresses in the DMA status table. The DMA status table then returns a status (busy/complete) to the application program. This provides the application program with information as to whether it may use the data at the address, whether it should wait, or whether it should carry out other tasks. Advantageously the inherent latency of the DMA transfers is hidden.

In accordance with one or more further embodiments of the present invention, methods and apparatus may provide for: receiving a first DMA command from a processor of a processing system for data stored within a memory of the processing system; and assigning an identifier to the first DMA command, the identifier for association with an entry of a DMA table containing status information regarding the first DMA command.

The DMA table may include at least one of: the identifier; a starting address of the memory at which the data are stored; an ending address of the memory at which the data are stored; a direction of the data transfer into or out of the memory; and the status information.

In accordance with one or more further embodiments of the present invention, methods and apparatus may provide for: executing a software program comprising a number of program tasks in a processor of a processing system; issuing a first DMA command for a data transfer from a first memory to a second memory of the processing system; issuing one or more status requests concerning the first DMA command to a snoop controller of the processing system; and postponing one or more processing tasks until a response to at least one of the status requests indicates that the data transfer from the first memory to the second memory has been completed.

In accordance with one or more further embodiments of the present invention, methods and apparatus may provide for: receiving an indication that a DMA data transfer from a first memory to a second memory of a processor has been completed; and updating status information of an entry of a DMA table associated with the DMA data transfer to indicate that the DMA data transfer has been completed.

In accordance with one or more further embodiments of the present invention, an apparatus may include: at least one processor capable of operative communication with a main memory; a local memory coupled to the at least one processor; a DMA command queue operable to store one or more DMA commands issued by the at least one processor; and a DMA table containing at least one entry associated with each of the DMA commands stored in the DMA command queue, one or more of the entries including status information regarding whether a DMA data transfer of an associated DMA command has been completed.

The apparatus may further include a snoop controller operable to receive indications of whether the DMA data transfers of the DMA commands have been completed. The snoop controller may be further operable to update the status information of the entries of the DMA table in accordance with whether the associated DMA data transfers have been completed. The snoop controller may be further operable to assign identifiers to the DMA commands, the identifiers associating the DMA commands with the respective entries of the DMA table. The snoop controller may be further operable to monitor the DMA command queue to determine whether the DMA data transfers have been completed. The snoop controller may be further operable to synchronize the DMA command queue to the DMA table to update the status information of the entries thereof.

Preferably, the at least one of: the DMA command queue is a hardware-implemented queue; and the DMA table is a software-implemented table.

The snoop controller is preferably further operable to at least one of: receive one or more status requests from the processor regarding the DMA commands; check the entries of the DMA table associated with the DMA commands to obtain the status information thereof; and return an indication to the processor of whether the data transfers of the DMA commands have been completed or not based on the status information.

The present invention was developed as a result of activities undertaken within the scope of a joint research agreement between Sony Computer Entertainment Inc. and International Business Machines Corporation.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
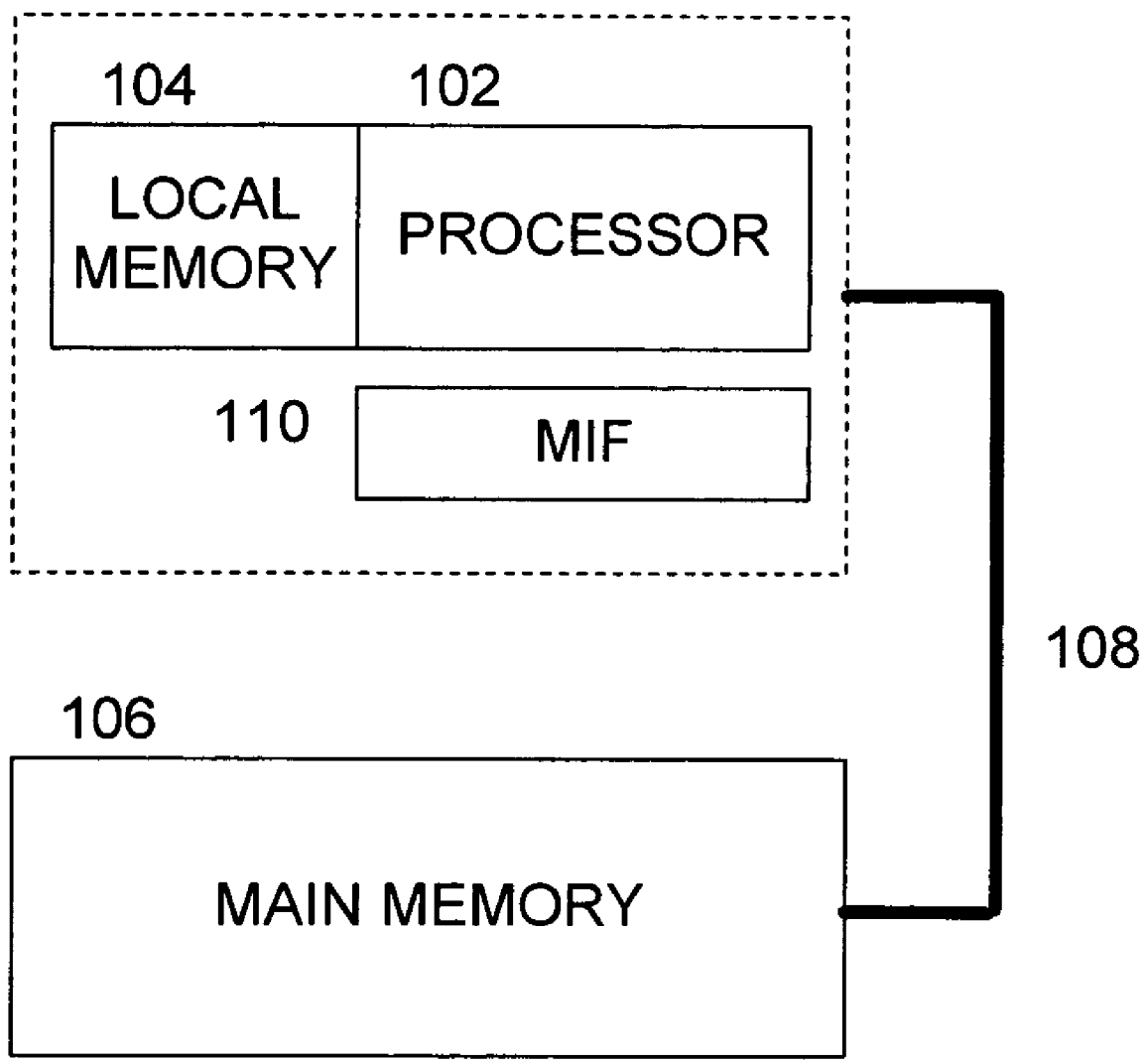
FIG. 1 is a block diagram illustrating the structure of a processing system that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The apparatus 100 preferably includes a processor 102, a local memory 104, a main memory 106 (e.g., a DRAM), and a bus 108. The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

The local memory 104 is located in proximity to the processor 102 such that the processor may execute program code and otherwise manipulate data within the local memory 104 as opposed to the system memory 106. The local memory 104 is preferably not a traditional hardware cache memory in that there are preferably no on chip or off chip hardware cache circuits, cache registers, cache memory controllers, etc. to implement a hardware cache memory function. As on-chip space may be limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access is preferably implemented utilizing a direct memory access controller DMAC within the memory interface 110.

Figure 2:
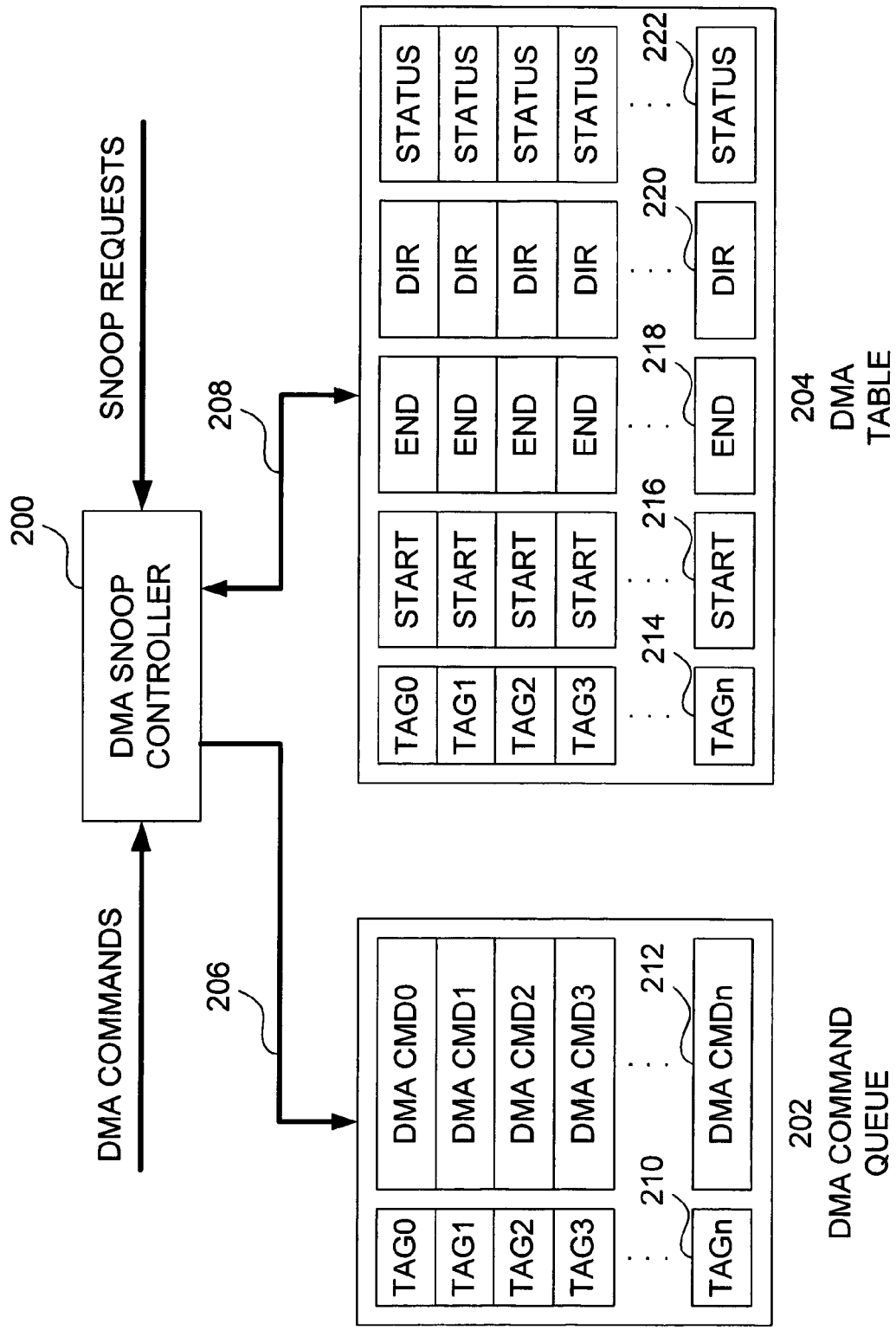
FIG. 2 is a block diagram illustrating a DMA snoop controller, a DMA command queue, and a DMA status table that may be employed by the processing system of FIG. 1 and/or other embodiments herein.

With further reference to FIG. 2, the system 100 may include a DMA snoop controller 200, a DMA command queue 202, and a DMA table 204. The DMA command queue 202 is operatively coupled to the DMA snoop controller 200, for example, by way of path 206, while the DMA table 204 is operatively coupled to the DMA snoop controller 200 by way of path 208.

The DMA command queue 202 is preferably operable to store one or more DMA commands 212 issued by the processor 102. The DMA commands 212 may include one or more of a start address of the data to be transferred, an end address of the data to be transferred, and a designation of the direction (source to destination) indicating where the transfer should take place. The DMA command queue 202 preferably also includes a tag 210 (or identifier) associated with each DMA command 212. The tag 210 preferably associates the respective DMA command 212 with one or more entries of the DMA table 204.

The DMA table 204 preferably includes a plurality of entries, each entry including one or more of a tag 214, a start address 216 for the data to be transferred, an end address 218 for the data to be transferred, a direction 220 (or other indicia of the source and destination of the data to be transferred), and status information 222. The tag 214 of each entry is preferably associated with a corresponding tag 210 within the DMA command queue 202. Thus, one or more of the DMA commands 212 may be associated with one or more corresponding entries of the DMA table 204. The status information 222 is preferably indicative of whether the data transfer of the corresponding DMA command 212 has been completed.

Preferably, the DMA command queue is implemented in hardware, such as by way of one or more hardware registers and associated logical circuitry. The DMA table 204 is preferably implemented by way of software, such as may be stored within the local memory 104 of the system 100.

Figure 3:
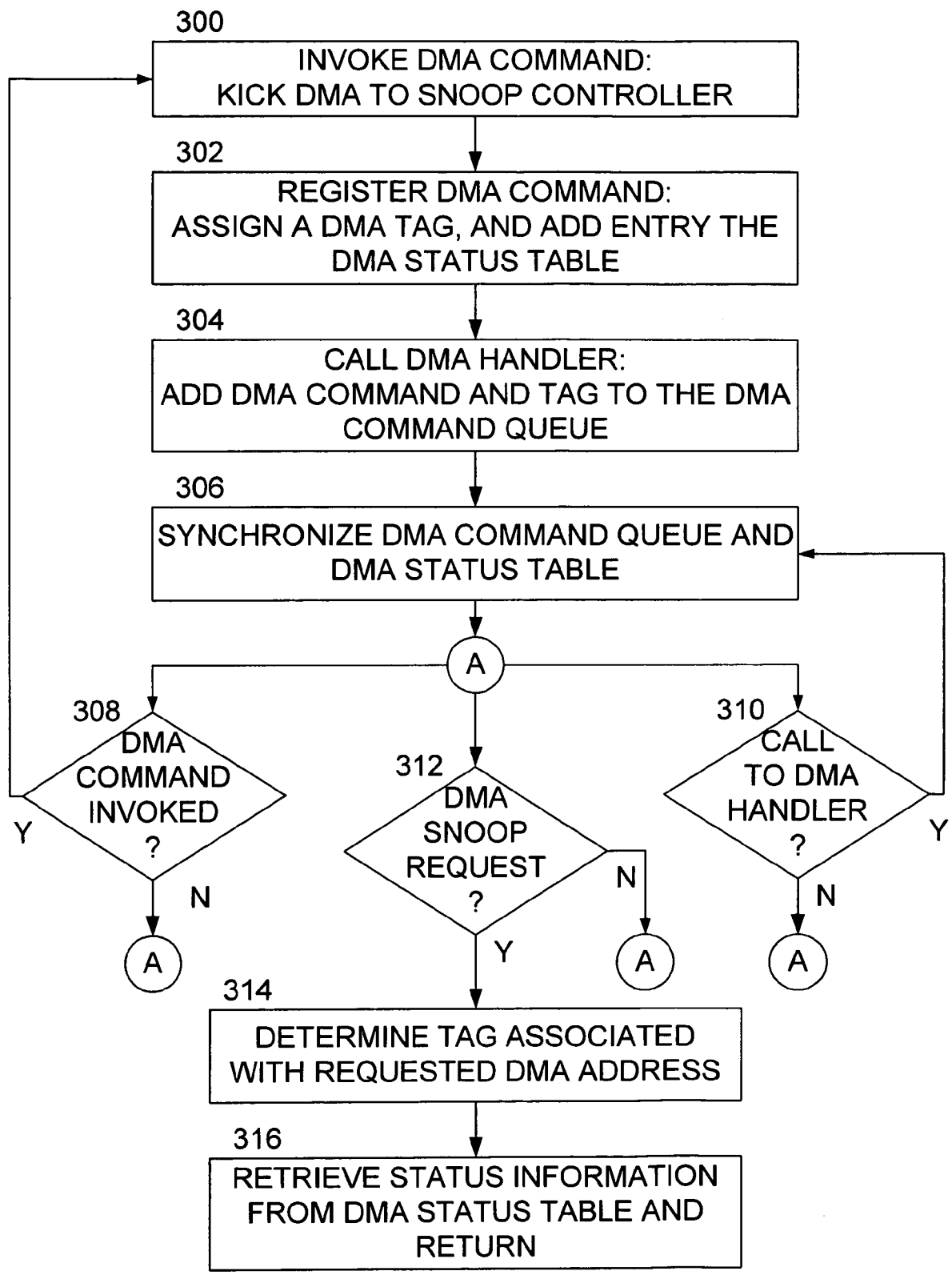
FIG. 3 is a flow diagram illustrating process steps that may be carried out by the processing system of FIG. 1 and/or other embodiments herein in accordance with one or more aspects of the present invention.

The above features of the system 100 may be better understood when taken in conjunction with the flow diagram of FIG. 3, which illustrates one or more process steps that may be implemented by one or more embodiments of the present invention. At action 300, a DMA command 212 may be invoked, for example, by the processor 102. The DMAC handler of the MIF 110 preferably services the DMA command 212 by employing well-known direct memory access techniques. In addition, the DMA commands 212 are preferably received by DMA snoop controller 200 so that they may be registered (action 302). Registration may include assigning a tag 210 to the DMA command 212 such that the tag 210 may be associated with the DMA command 212 within the DMA command queue 202. Registration may also entail adding an entry to the DMA status table 204, where the entry includes a corresponding tag 214 and at least status information 222. Initially, the status information 222 will indicate that the data transfer associated with the DMA command 212 has not been completed. At action 304, the DMAC may add the DMA command 212 and the tag 210 to the DMA command queue 202. At this point, the DMA command 212 may be (or is) synchronized with the associated entry (or entries) of the DMA table 204 vis-à-vis the status information 222 (action 306).

The process flow may then advance to node A, from which at least three paths may be taken. At action 308, a determination may be made as to whether another DMA command 212 has been invoked. If the result of the determination is in the affirmative, then the process flow preferably flows back to action 300 and actions 300-306 are carried out again. If the result of the determination at action 308 is negative, then the process flow preferably loops back to node A.

At action 310, a determination is preferably made as to whether a call to the DMA handler has taken place. This may be a situation where the DMAC has completed the data transfer associated with a particular DMA command 212. If the result of the determination at action 310 is in the affirmative, then the process flow preferably flows back to action 306. At action 306, the DMA snoop controller 200 preferably facilitates the synchronization between the DMA command queue 202 and the one or more entries of the DMA table 204 associated with that command 212. The synchronization preferably entails changing the status information 222 of the given entry to indicate that the data transfer associated with the DMA command 212 has been completed. The specifics of the synchronization may also include finding the appropriate entry or entries of the DMA table 204. This may be achieved by way of identifying the tag 210 associated with the DMA command 212 within the DMA command queue 202 and determining the corresponding tag (or tags) 214 of the DMA table 204. On the other hand, if the result of the determination at action 310 is negative, then the process flow preferably flows back to node A.

At action 312, a determination is preferably made as to whether a DMA snoop request has been received by the DMA snoop controller 200. By way of example, the processor 102 may issue a snoop request to the DMA snoop controller 200 to find out whether one or more of the DMA commands 212 have been serviced, e.g., by completing the data transfer(s) associated therewith. The snoop request may specify the address to which or from which the data are to be transferred. If the result of the determination at action 312 is in the negative, then the process flow preferably flows back to node A. If the result of the determination at action 312 is in the affirmative, then the DMA snoop controller 200 preferably obtains the status information 222 from the DMA table 204 to determine whether the data transfer associated with the given DMA command 212 has been completed. This may entail determining the tag 210 associated with the given DMA command 212 by checking the DMA command queue 202. By way of example, the snoop request may include at least one of the start address of the data to be transferred and the end address of the data to be transferred. The DMA snoop controller 200 may utilize one or more of these addresses to find the corresponding DMA command 212 within the DMA command queue 202 and thus obtain the associated tag 210. Once the DMA snoop controller 200 has the tag 210, it may utilize such tag to find the associated tag 214 within the DMA table 204. At action 316, the DMA snoop controller 200 preferably retrieves the status information 222 from the entry associated with the tag 214 and returns an indication of whether the data transfer has been completed to the processor 102.

Advantageously, the processor 102 may be executing one or more software programs comprising a number of program tasks. As a consequence of executing the software program, the processor 102 may issue one or more DMA commands 212 such that data may be transferred from the main memory 106 to the local memory 104 or vice versa. The processor 102 may obtain an indication of the status of one or more of the DMA commands by issuing snoop request(s) to the DMA snoop controller 200 and receiving status updates therefrom. The processor 102 may utilize this information to take appropriate steps during the execution of the software program to increase processing efficiency, such as hiding the latency associated with DMA data transferred. For example, the processor 102 may postpone one or more processing tasks until a response to one or more status requests indicate that the data transfers associated with certain DMA command(s) have been completed. During such postponements, the processor 102 may carry out other processing tasks and/or may enter a sleep mode in order to reduce power dissipation.

Figure 4:
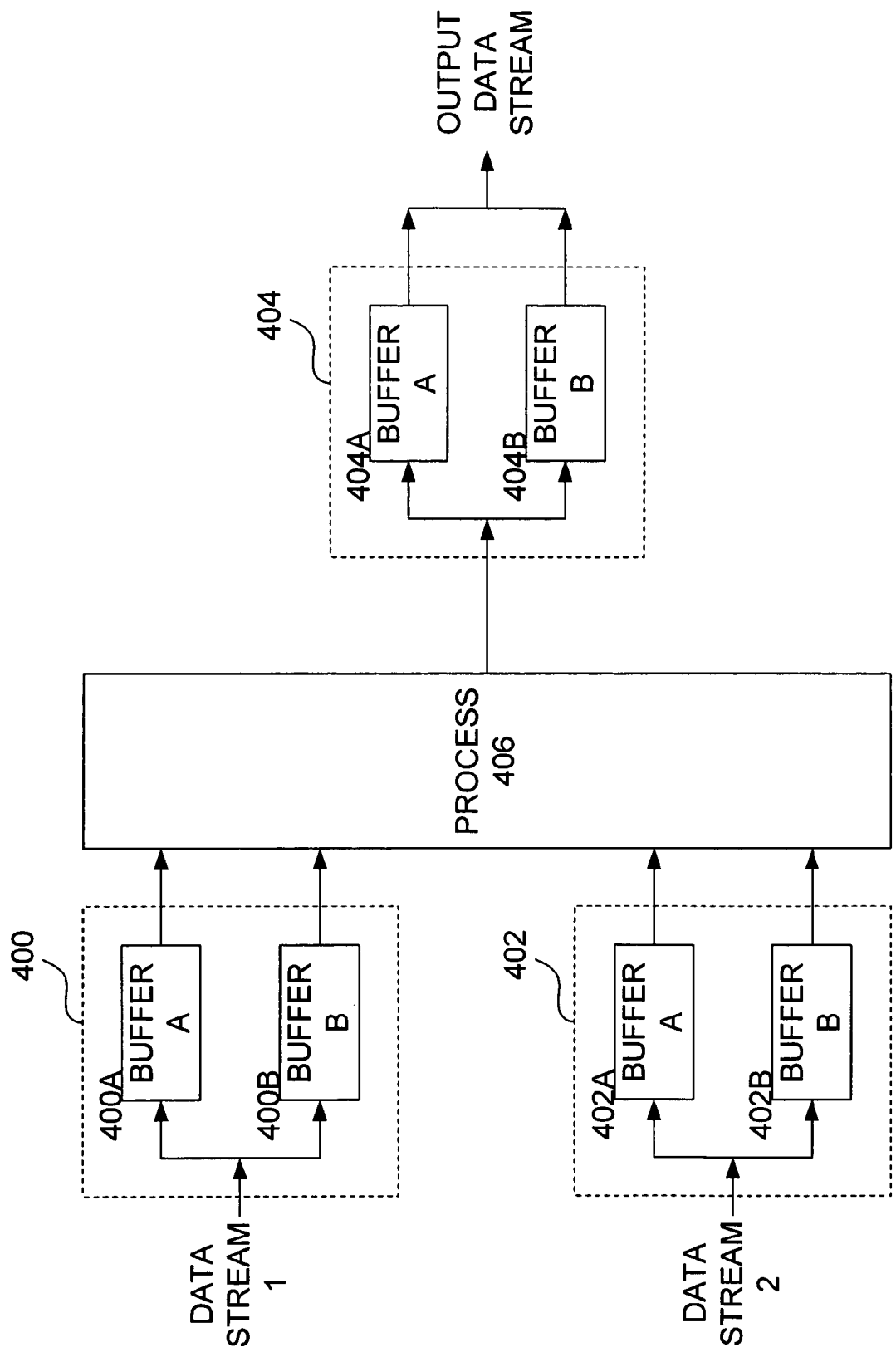
FIG. 4 is a block diagram illustrating an example of how the DMA snoop controller, DMA command queue, and DMA status table may be employed to hide the latency of a process employing double buffers to merge two data streams into one data stream.

With reference to FIG. 4, a further example of how the DMA snoop controller 200, DMA command queue 202, and DMA table 204 may be used to hide DMA data transfer latency is illustrated. In particular, FIG. 4 is a block diagram of a data stream merging process that may be implemented utilizing the processing system 100 of FIG. 1. In particular, the processor 102 and the local memory 104 may be utilized to implement a plurality of double-buffers 400, 402, and 404 as well as a merging process 406. (In alternative embodiments, more than one processor may be employed as will be discussed hereinbelow.) It is understood that the elements of FIG. 4 are implemented utilizing a combination of hardware/software. Each double-buffer, such as double-buffer 400, includes a first buffer A (starting at address 400A) and a second buffer B (starting at address 400B).

The first double-buffer 400 receives a first data stream and the second double-buffer 402 receives a second data stream. The data streams are merged by way of the merge process 406 and delivered to the third double-buffer 404, which produces an output data stream. Such a merging process may be used to combine respective frames of image data in a graphics process. For the purposes of discussion, it is assumed that the first data stream and the second data stream are received from the main memory 106 or from some external source (not shown) by way of DMA data transfers. Further, it is assumed that the output data stream is stored in the main memory 106 or some other part of the memory space by way of DMA transfers.

Initially, each of the first and second double-buffers 400, 402 seek to receive respective chunks of data from the first and second data streams by way of respective DMA commands 212 issued by the processor 102 to the DMAC. For the purposes of illustration, it is assumed that the respective destinations of the DMA transfers are to starting address 400A of buffer A of the first double-buffer 400 and start address 402A of buffer A of the second double-buffer 402. The processor 102 may then perform other tasks while checking the status of the DMA transfers from time to time as discussed hereinabove.

When the status information 222 as to one of the DMA transfers indicates that the data transfer is complete, such as to start address 400A of buffer A of the first double-buffer 400, then the processor 102 may react to the status information 222. For example, the processor 102 may swap the role of the buffers A, B, issue another DMA command requesting another chunk of data for transfer to start address 400B of buffer B, and begin processing the data stored in buffer A (such as performing a decompression processes). While waiting on the DMA data transfer into buffer B, the processor 102 may issue one or more snoop requests to the DMA snoop controller 200 to obtain the status thereof.

Meanwhile, the processor 102 may be performing similar snoop requests, buffer swaps, further DMA transfer requests and data processing concerning the data of the second data stream being received by the second double-buffer 402. As the content of the respective data streams is different and the DMA transfer latency is not fixed, the frequency of the buffer swaps within the double-buffers 400 and 402 may vary. Notably, however, the use of the DMA snoop controller 200, DMA command queue 202, and DMA table 204 permits the processor 102 to perform numerous tasks in order to hide the DMA transfer latency associated with transferring chunks of the respective first and second data streams.

When the data in the buffer A of the first double-buffer 400 has been processed and the data within buffer A of the second double-buffer 402 has been processed, then the merge process 406 may merge such data and store same starting at start address 404A of buffer A of the third double-buffer 404. When such merged data is stable in the buffer A, the processor 102 may issue a DMA data transfer of such data to, for example, the main memory 106. From time to time, the processor 102 may issue one or more snoop requests to the DMA snoop controller 200 to determine the status of such DMA command. When the status information 222 indicates that the DMA data transfer has been completed, the processor 102 may facilitate a swap of buffer A and buffer B of the third double-buffer 404 such that further data processing (e.g., data compression) and DMA data transfers may be carried out in parallel. This process preferably repeats until all the data have been merged and stored.

Figure 5:
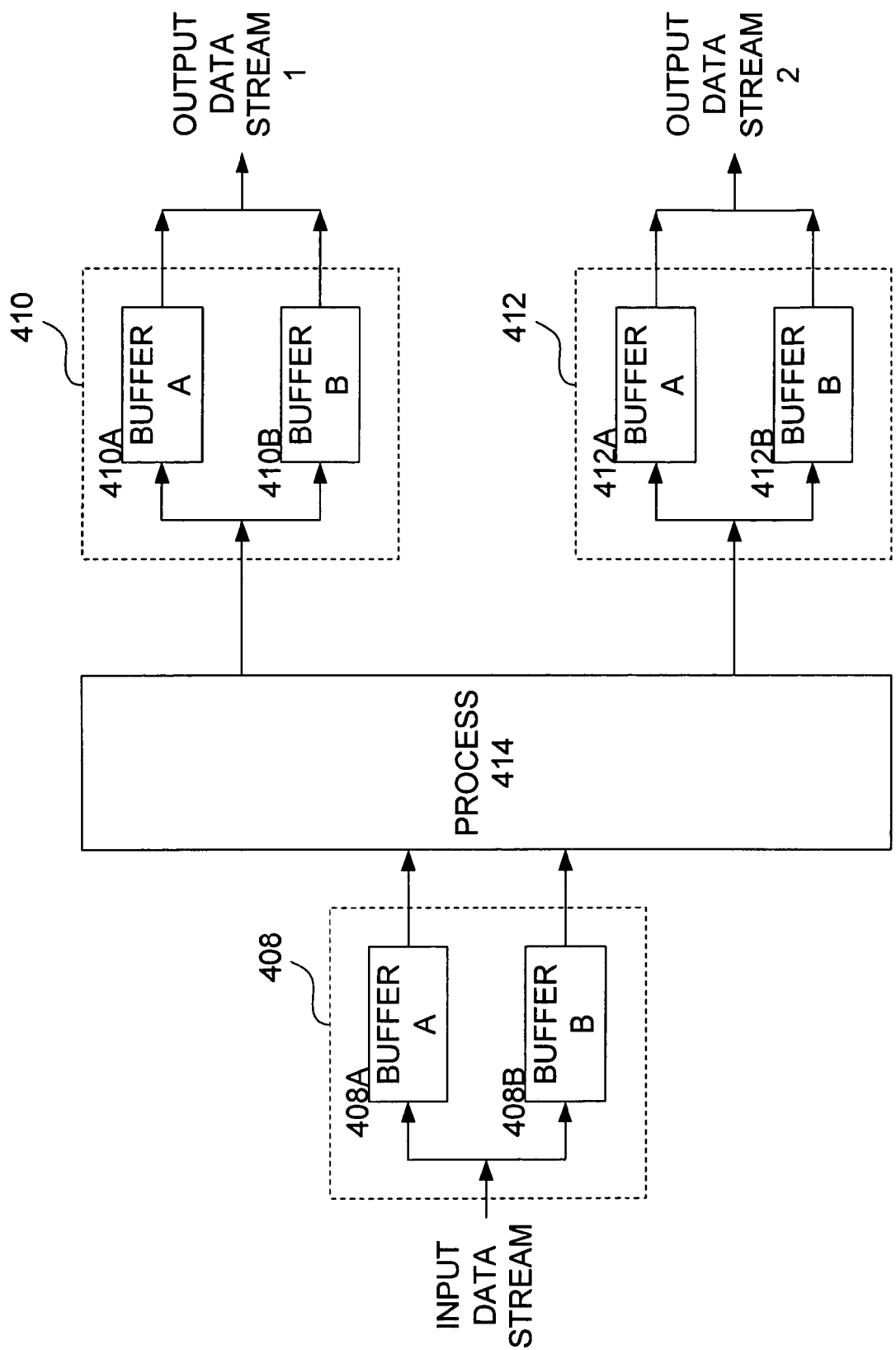
FIG. 5 is a block diagram illustrating an example of how the DMA snoop controller, DMA command queue, and DMA status table may be employed to hide the latency of a process employing double buffers to de-interleave one data stream into two data streams.

With reference to FIG. 5, a further example of how the DMA snoop controller 200, DMA command queue 202, and DMA table 204 may be used to hide DMA data transfer latency is illustrated. FIG. 5 is a block diagram of a data stream de-interleaving process that may be implemented utilizing the processing system 100 of FIG. 1. In particular, the processor 102 and the local memory 104 may be utilized to implement a plurality of double-buffers 408, 410, and 412 as well as a de-interleaving process 414. (In alternative embodiments, more than one processor may be employed as will be discussed hereinbelow.)

The first double-buffer 408 receives an input data stream and delivers the data therein to the de-interleaving process 414. The de-interleaving process may separate chunks of data (such as frames of image data) that have been previously merged or interleaved in order to produce first and second output data streams. For the purposes of discussion, it is assumed that the input data stream is received from the main memory 106 or from some external source (not shown) by way of DMA data transfers. Further, it is assumed that the first and second output data streams are transferred to the main memory 106 or some external source (not shown) by way of DMA data transfers.

For the purposes of illustration, it is assumed that the destination of the DMA transfers representing the input data stream are alternately to starting address 408A of buffer A and to address 408B of buffer B of the first double-buffer 408. When the status information 222 as to one of the DMA transfers indicates that the data transfer is complete, such as to start address 408A of buffer A of the first double-buffer 408, then the processor 102 may react to the status information 222. For example, the processor 102 may swap the role of the buffers A, B, issue another DMA command requesting another chunk of data for transfer to start address 408B of buffer B, and begin processing the data stored in buffer A (such as performing a decompression processes). While waiting on the DMA data transfer into buffer B, the processor 102 may issue one or more snoop requests to the DMA snoop controller 200 to obtain the status thereof.

The de-interleaved data streams produced by the de-interleaving process 414 are input into the second and third double-buffers 410, 412. Assuming that the de-interleaving process produces respective frames of image data, such frames may be alternately written into buffer A and buffer B of the second and third double-buffers 410, 412. When data are present in, for example buffer A of the second double-buffer 410, the processor 102 may perform compression or some other data manipulation. During that time, the data in buffer B (assuming that it has been already been compressed, etc.) may be transferred to the main memory 106 by way of a DMA command 212 issued by the processor 102. When the status information 222 as to the DMA transfer from buffer B indicates that the data transfer is complete, then the processor 102 may swap the role of the buffers A, B, issue another DMA command requesting the transfer of data from buffer A to the main memory 106. Again, while waiting on the DMA data transfer from buffer A, the processor 102 may issue one or more snoop requests to the DMA snoop controller 200 to obtain the status thereof.

Meanwhile, the processor 102 may be performing similar snoop requests, buffer swaps, further DMA transfer requests and data processing concerning the data of the second data stream being received by the third double-buffer 412. As the content of the respective data streams is different and the DMA transfer latency is not fixed, the frequency of the buffer swaps within the double-buffers 408, 410 and 412 may vary. Notably, however, the use of the DMA snoop controller 200, DMA command queue 202, and DMA table 204 permits the processor 102 to perform numerous tasks in order to hide the DMA transfer latency associated with transferring the data of the data streams. This process preferably repeats until all the data have been merged and stored.

Figure 6:
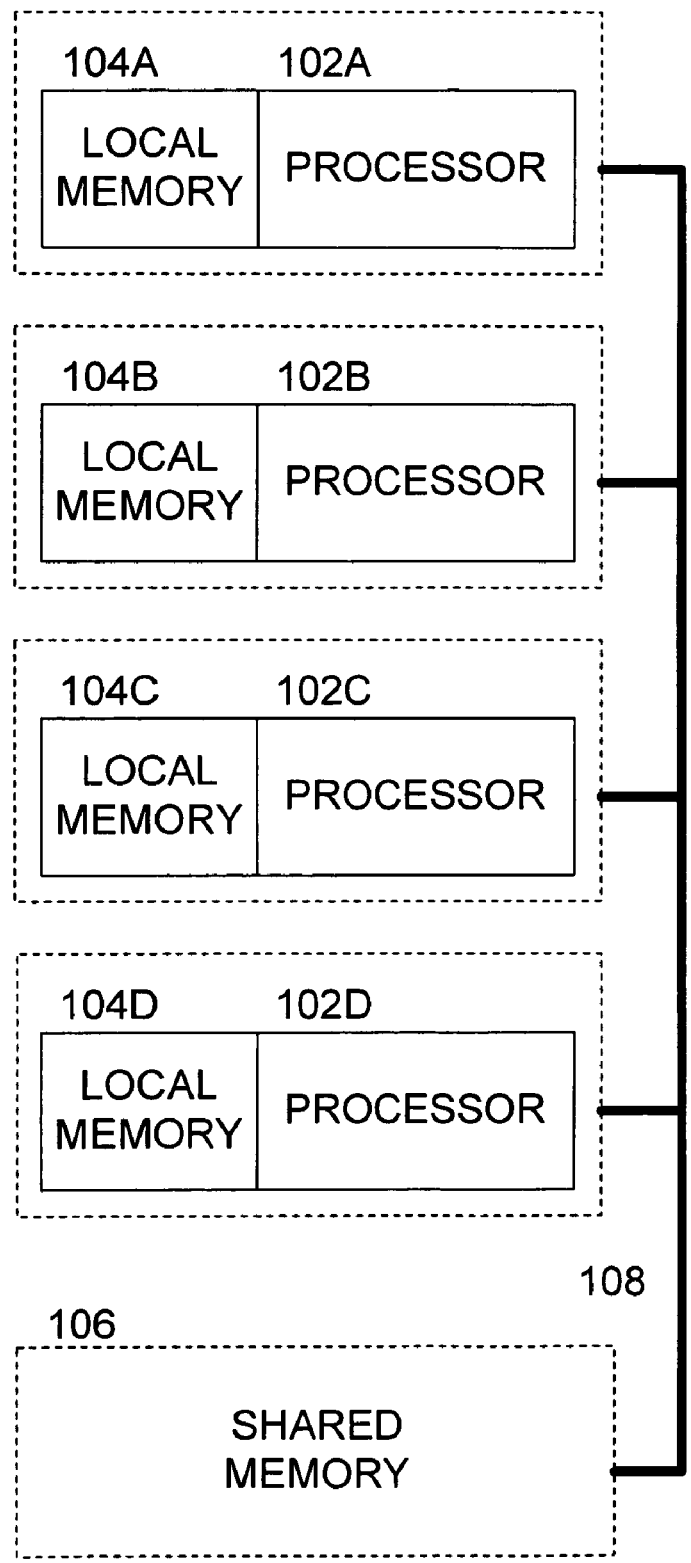
FIG. 6 is a diagram illustrating the structure of a multi-processing system having two or more sub-processors that may be adapted in accordance with one or more aspects of the present invention.

FIG. 6 illustrates a multi-processing system 100A that may be adapted to implement one or more of the features discussed hereinabove and one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes, preferably enhances the processing power of these members, and preferably facilitates the preparation of applications for processing by these members.

Figure 7:
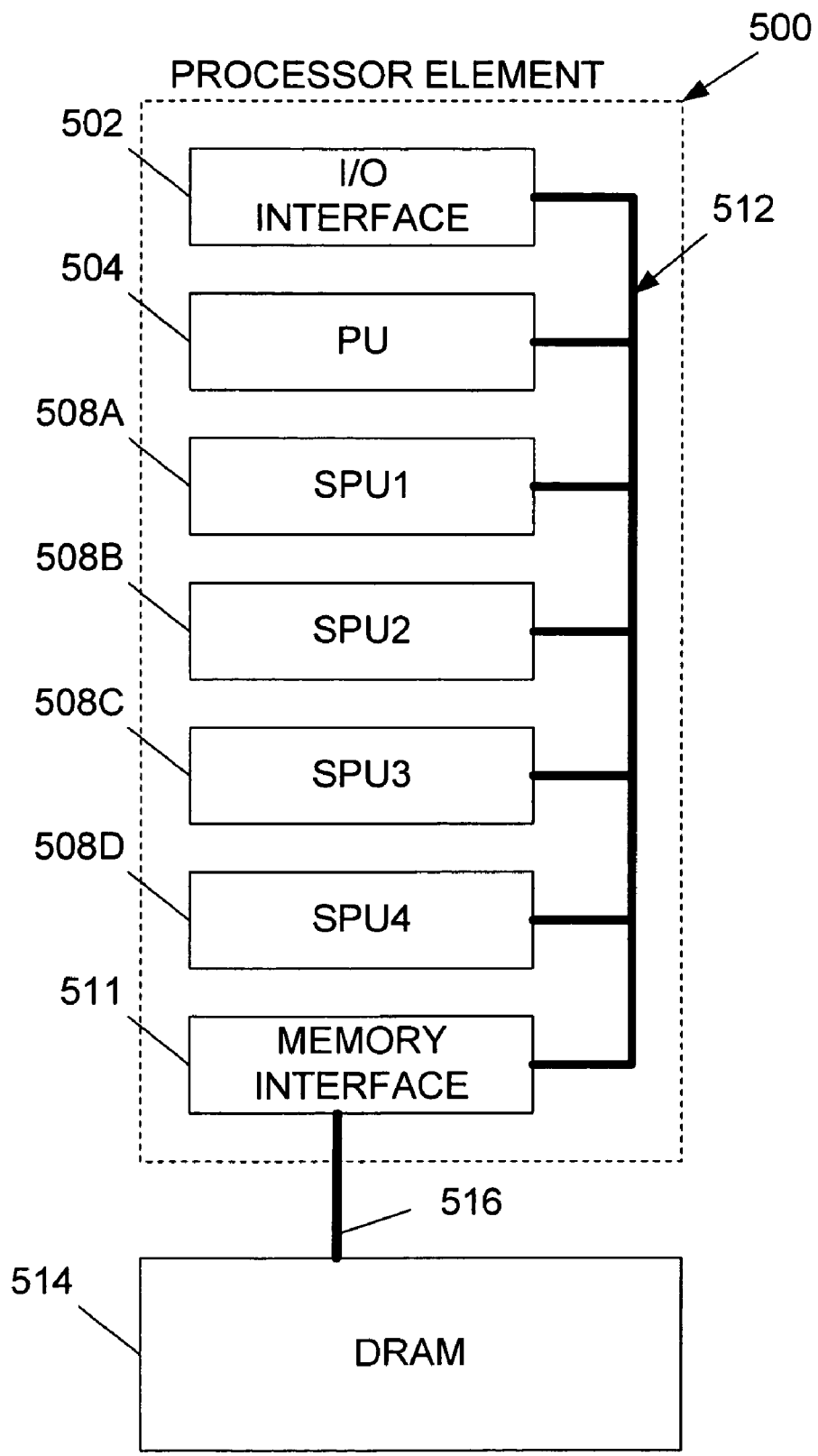
FIG. 7 is a diagram illustrating a preferred processor element (PE) that may be used to implement one or more further aspects of the present invention.

With reference to FIG. 7, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 8:
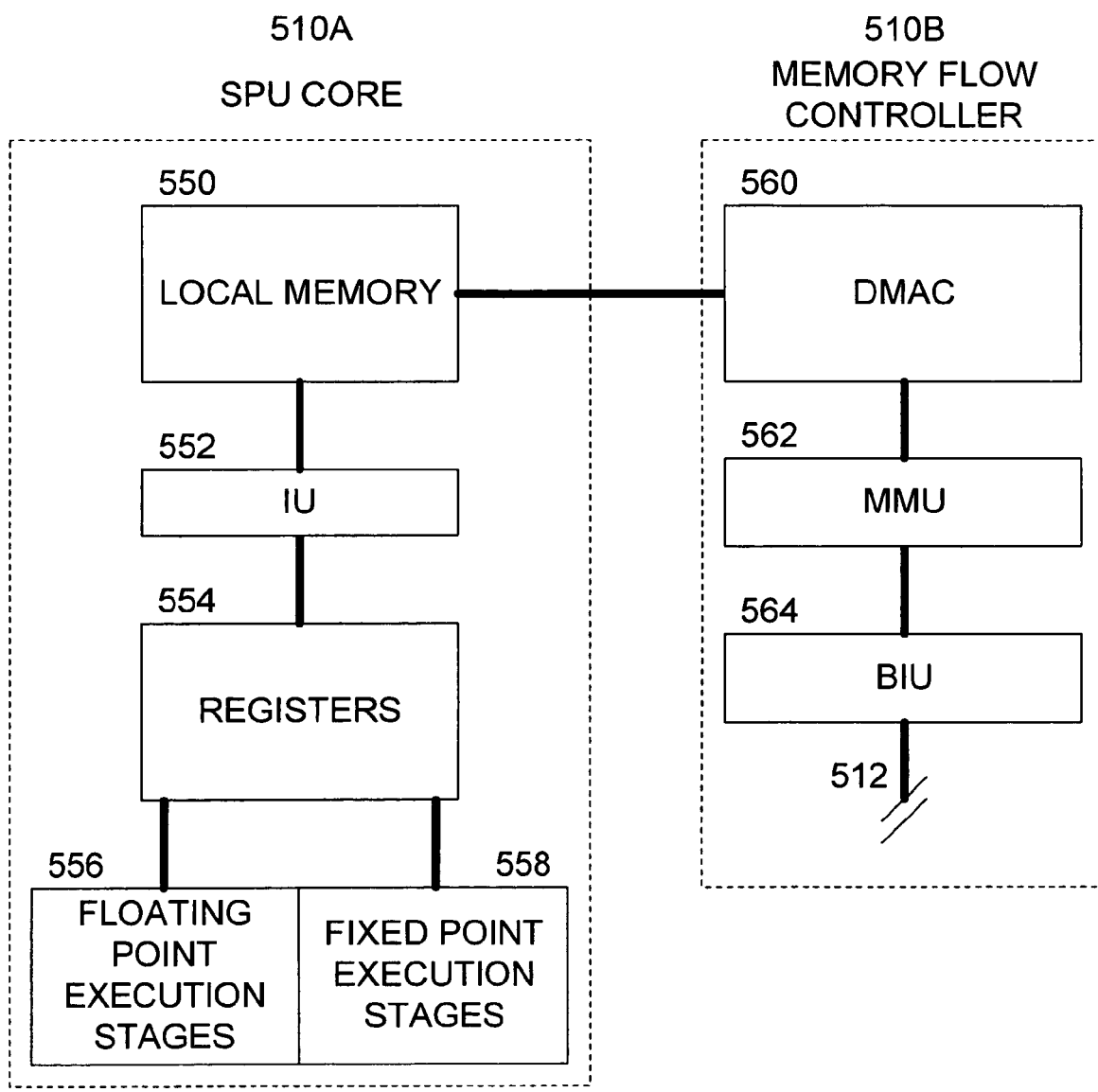
FIG. 8 is a diagram illustrating the structure of an exemplary sub-processing unit (SPU) of the system of FIG. 7 that may be adapted in accordance with one or more further aspects of the present invention.

FIG. 8 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1 M-, and 16 M-byte page sizes and 256 MB segment sizes. Preferably, the MMU 562 is operable to support up to 265 bytes of virtual memory, and $2^{42}$ bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 9:
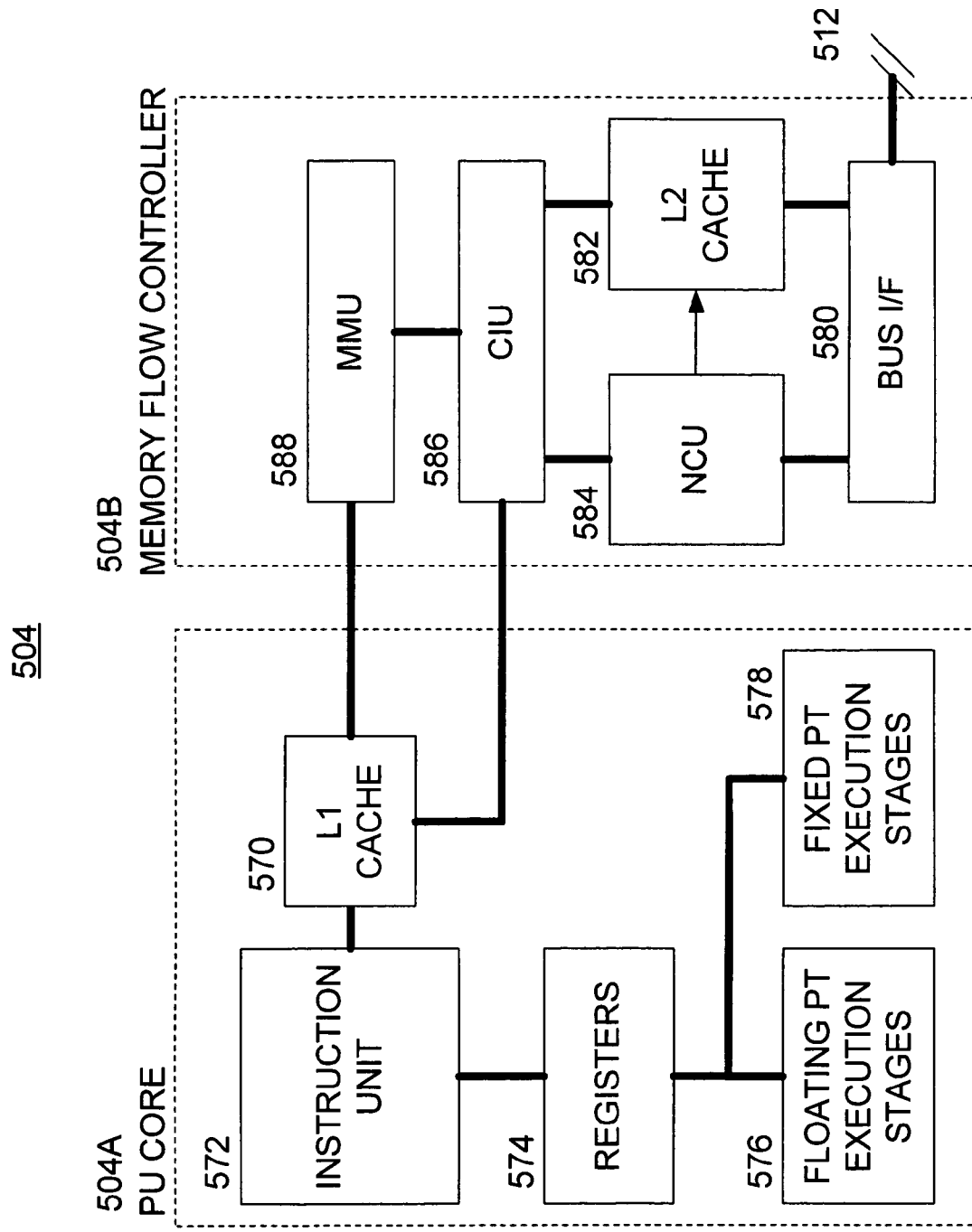
FIG. 9 is a diagram illustrating the structure of an exemplary processing unit (PU) of the system of FIG. 7 that may be adapted in accordance with one or more further aspects of the present invention.

FIG. 9 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:

performing at least one of: (i) a data merge process in which first and second data streams are received within a processor of a processing system by way of DMA transfers from a memory of the processing system, first and second data streams are merged into an output data stream, and the output data stream is written into the memory of the processing system by way of DMA transfers, and (ii) a de-interleaving process in which the output data stream is read from the memory of the processing system by way of DMA transfers, the output data stream is de-interleaved into the first and second data streams, and the first and second data streams written into the memory of the processing system by way of DMA transfers;

receiving a DMA command at a snoop controller from the processor for blocks of data stored within the memory of the processing system associated with one or more of the first, second, and output data streams;

assigning an identifier to the DMA command;

storing the DMA command and the identifier in a hardware-implemented DMA command queue;

associating the identifier with an entry of status information regarding the DMA command; and storing the identifier and the entry in a software implemented DMA table.

2. The method of claim 1, further comprising initializing the status information of the entry of the DMA table associated with the DMA command to indicate that the data transfer associated therewith has not been completed.

3. The method of claim 1, further comprising updating the status information of the entry of the DMA table associated with the DMA command when the data transfer associated therewith has been completed.

4. The method of claim 1, further comprising receiving a status request from the processor regarding the DMA command.

5. The method of claim 4, further comprising checking the entry of the DMA table associated with the DMA command to obtain the status information.

6. The method of claim 5, returning an indication to the processor of whether the data transfer of the DMA command has been completed or not based on the status information.

7. The method of claim 1, wherein the DMA table includes at least one of: the identifier; a starting address of the memory at which the data are stored; an ending address of the memory at which the data are stored; a direction of the data transfer into or out of the memory; and the status information.

8. A method, comprising:
    executing a software program comprising a number of program tasks in a processor of a processing system;
    issuing a DMA command for a data transfer from a first memory to a second memory of the processing system;
    issuing one or more status requests concerning the DMA command to a snoop controller of the processing system, the snoop controller: receiving the DMA command from the processor, assigning an identifier to the DMA command, the identifier for association with an entry of a software implemented DMA table containing status information regarding the DMA command, storing the DMA command and the identifier in a hardware-implemented DMA command queue, and storing the identifier and the entry in the DMA table;
    postponing one or more processing tasks until a response to at least one of the status requests indicates that the data transfer from the first memory to the second memory has been completed; and
    entering a sleep mode of operation within the processor to reduce power dissipation while the one or more processing tasks are postponed.

9. The method of claim 8, further comprising initializing the status information of the entry of the DMA table associated with the DMA command to indicate that the data transfer associated therewith has not been completed.

10. The method of claim 9, further comprising updating the status information of the entry of the DMA table associated with the DMA command when the data transfer associated therewith has been completed.

11. The method of claim 9, further comprising:
    receiving the status request from the processor regarding the DMA command;
    checking the entry of the DMA table associated with the DMA command to obtain the status information; and
    returning an indication to the processor of whether the data transfer of the DMA command has been completed or not based on the status information.

12. A method, comprising:
    performing at least one of: (i) a data merge process in which first and second data streams are received within a processor of a processing system by way of DMA transfers from a memory of the processing system, first and second data streams are merged into an output data stream, and the output data stream is written into the memory of the processing system by way of DMA transfers, and (ii) a de-interleaving process in which the output data stream is read from the memory of the processing system by way of DMA transfers, the output data stream is de-interleaved into the first and second data streams, and the first and second data streams written into the memory of the processing system by way of DMA transfers;
    receiving a DMA command at a snoop controller from the processor for blocks of data stored within the memory of the processing system associated with one or more of the first, second, and output data streams; and
    within the snoop controller:
    assigning an identifier to the DMA command;
    storing the DMA command and the identifier in a hardware-implemented DMA command queue;
    associating the identifier with an entry of status information regarding the DMA command;
    storing the identifier and the entry in a software implemented DMA table;
    receiving an indication that a DMA data transfer associated with the DMA command from a first memory to a second memory of a processor has been completed; and
    updating the status information of the entry of the DMA table associated with the DMA command to indicate that the DMA data transfer has been completed.

13. The method of claim 12, wherein the DMA table is a software implemented table.

14. The method of claim 12, further comprising monitoring the hardware-implemented DMA command queue to determine whether the DMA data transfer from the first memory to the second memory has been completed.

15. The method of claim 14, further comprising synchronizing the hardware-implemented DMA command queue to the DMA table to update the status information of the entry thereof.

16. The method of claim 15, wherein the DMA table is a software-implemented table.

17. The method of claim 12, further comprising at least one of:
    receiving a status request from the processor regarding the DMA command;
    checking the entry of the DMA table associated with the DMA command to obtain the status information; and
    returning an indication to the processor of whether the data transfer of the DMA command has been completed or not based on the status information.

18. A computer-readable non-transitory storage medium containing a software program, the software program being operable, when executed, to cause a processor of a processing system to carry out actions including:
    performing at least one of: (i) a data merge process in which first and second data streams are received within a processor of a processing system by way of DMA transfers from a memory of the processing system, first and second data streams are merged into an output data stream, and the output data stream is written into the memory of the processing system by way of DMA transfers, and (ii) a de-interleaving process in which the output data stream is read from the memory of the processing system by way of DMA transfers, the output data stream is de-interleaved into the first and second data streams, and the first and second data streams written into the memory of the processing system by way of DMA transfers;
    receiving a DMA command from the processor for blocks of data stored within the memory of the processing system associated with one or more of the first, second, and output data streams;
    assigning an identifier to a DMA command of the processing system;
    storing the DMA command and the identifier in a hardware-implemented DMA command queue;
    associating the identifier with an entry of status information regarding the DMA command;
    storing the identifier and the entry in a software implemented DMA table;
    receiving an indication that a DMA data transfer defined by the DMA command has been completed; and updating the status information of the entry of the DMA table associated with the DMA command to indicate that the DMA data transfer has been completed.

19. The storage medium of claim 18, further comprising monitoring the hardware-implemented DMA command queue to determine whether the DMA data transfer has been completed.

20. The storage medium of claim 19, further comprising synchronizing the hardware-implemented DMA command queue to the DMA table to update the status information of the entry thereof.

21. The storage medium of claim 18, further comprising at least one of:
receiving a status request from the processor regarding the DMA command;
checking the entry of the DMA table associated with the DMA command to obtain the status information; and
returning an indication to the processor of whether the data transfer of the DMA command has been completed or not based on the status information.

22. The storage medium of claim 18, wherein the DMA table includes at least one of: the identifier; a starting address of the memory at which the data are stored; an ending address of the memory at which the data are stored; a direction of the data transfer into or out of the memory; and the status information.

23. The storage medium of claim 18, wherein the DMA table is a software implemented table.

24. A computer-readable non-transitory storage medium containing a first software program, the first software program being operable to cause a processor of a processing system to execute actions including:
executing a second software program comprising a number of program tasks;
issuing a DMA command for a data transfer from a first memory to a second memory of the processing system;
issuing one or more status requests concerning the DMA command to a snoop controller of the processing system; the snoop controller: receiving the DMA command from the processor, assigning an identifier to the DMA command, the identifier for association with an entry of a software implemented DMA table containing status information regarding the DMA command, storing the DMA command and the identifier in a hardware-implemented DMA command queue, and storing the identifier and the entry in the DMA table;
postponing one or more processing tasks until a response to at least one of the status requests indicates that the data transfer from the first memory to the second memory has been completed; and
entering a sleep mode of operation within the processor to reduce power dissipation while the one or more processing tasks are postponed.

25. An apparatus, comprising:
at least one processor capable of operative communication with a main memory;
a local memory coupled to the at least one processor;
a snoop controller including: a hardware-implemented DMA command queue operable to store one or more DMA commands issued by the at least one processor, and to store a respective identifier assigned to each of the DMA commands; and a software-implemented DMA table containing: (i) at least one entry associated with each of the DMA commands stored in the DMA command queue, each entry including status information regarding whether a DMA data transfer of the associated DMA command has been completed, and (ii) the identifiers assigned to each of the DMA commands and assigned to the at least one entry;
the at least one processor performing at least one of: (i) a data merge process in which first and second data streams are received within the local memory of the processor by way of DMA transfers from the main memory of the processing system, first and second data streams are merged into an output data stream, and the output data stream is written into the main memory of the processing system by way of DMA transfers, and (ii) a de-interleaving process in which the output data stream is read from the main memory of the processing system by way of DMA transfers to the local memory of the at least one processor, the output data stream is de-interleaved into the first and second data streams, and the first and second data streams written into the main memory of the processing system by way of DMA transfers; and
the at least one processor sending a DMA command to the snoop controller for blocks of data stored within the memory of the processing system associated with one or more of the first, second, and output data streams.

26. The apparatus of claim 25, wherein the snoop controller receives indications of whether the DMA data transfers of the DMA commands have been completed.

27. The apparatus of claim 26, wherein the snoop controller updates the status information of the entries of the DMA table in accordance with whether the associated DMA data transfers have been completed.

28. The apparatus of claim 26, wherein the snoop controller assigns the identifiers to the DMA commands, the identifiers associating the DMA commands with the respective entries of the DMA table.

29. The apparatus of claim 27, wherein the snoop controller monitors the DMA command queue to determine whether the DMA data transfers have been completed.

30. The apparatus of claim 29, wherein the snoop controller synchronizes the DMA command queue to the DMA table to update the status information of the entries thereof.

31. The apparatus of claim 26, wherein the snoop controller at least one of:
receives one or more status requests from the processor regarding the DMA commands;
checks the entries of the DMA table associated with the DMA commands to obtain the status information thereof; and
returns an indication to the processor of whether the data transfers of the DMA commands have been completed or not based on the status information.

32. The apparatus of claim 25, further comprising a plurality of parallel processors capable of operative communication with the main memory, each processor including a local memory that is not a hardware cache memory, and an instruction execution pipeline.

33. The apparatus of claim 32, wherein each processor is capable of executing the one or more programs within its local memory, but each processor is not capable of executing the one or more programs within the main memory.

34. The apparatus of claim 32, wherein the processors and associated local memories are disposed on a common semiconductor substrate.

35. The apparatus of claim 32, wherein, the processors, associated local memories, and the main memory are disposed on a common semiconductor substrate.

36. A method, comprising:
performing at least one of: (i) a data merge process in which first and second data streams are received within a processor of a processing system by way of DMA transfers from a memory of the processing system, first and second data streams are merged into an output data stream, and the output data stream is written into the memory of the processing system by way of DMA transfers, and (ii) a de-interleaving process in which the output data stream is read from the memory of the processing system by way of DMA transfers, the output data stream is de-interleaved into the first and second data streams, and the first and second data streams written into the memory of the processing system by way of DMA transfers;
receiving a DMA command at a snoop controller from the processor for blocks of data stored within the memory of the processing system associated with one or more of the first, second, and output data streams;
assigning an identifier to the DMA command;
storing the DMA command and the identifier in a DMA command queue;
associating the identifier with an entry of status information regarding the DMA command; and
storing the identifier and the entry in a DMA table.

37. The method of claim 36, comprising:
executing a software program comprising a number of program tasks in the processor of the processing system;
issuing a DMA command for a data transfer from a first memory to a second memory of the processing system;
issuing one or more status requests concerning the DMA command to the snoop controller of the processing system, the snoop controller: receiving the DMA command from the processor, assigning an identifier to the DMA command, the identifier for association with an entry of the DMA table containing status information regarding the DMA command, storing the DMA command and the identifier in the DMA command queue, and storing the identifier and the entry in the DMA table;
postponing one or more processing tasks until a response to at least one of the status requests indicates that the data transfer from the first memory to the second memory has been completed; and
entering a sleep mode of operation within the processor to reduce power dissipation while the one or more processing tasks are postponed.

38. The method of claim 36, wherein the DMA table is a software implemented DMA table, and the DMA command queue is a hardware implemented DMA command queue.

* * * * *